United States Patent

Andersion

[11] Patent Number: 6,094,221
[45] Date of Patent: Jul. 25, 2000

[54] SYSTEM AND METHOD FOR USING A SCRIPTING LANGUAGE TO SET DIGITAL CAMERA DEVICE FEATURES

[76] Inventor: Eric C. Andersion, 931 Brentwood Dr., San Jose, Calif. 95129

[21] Appl. No.: 08/778,301

[22] Filed: Jan. 2, 1997

[51] Int. Cl.[7] .............................. H04N 5/76; H04N 7/00; H04N 11/00; G06F 9/45
[52] U.S. Cl. ........................... 348/231; 348/552; 395/705
[58] Field of Search ................................... 348/231, 233, 348/552, 232; 396/48, 429, 300; 395/705

[56] References Cited

U.S. PATENT DOCUMENTS

| | | | |
|---|---|---|---|
| 4,704,699 | 11/1987 | Farina et al. . | |
| 5,404,528 | 4/1995 | Mahajan et al. | 395/705 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,493,335 | 2/1996 | Parulski et al. | 348/233 |
| 5,826,088 | 10/1998 | Sitbon et al. | 395/705 |

OTHER PUBLICATIONS

Martyn Williams, Review–NEC PC–DC401 Digital Still Camera, AppleLink Newbytes, Mar. 15, 1996, pp. 1–3.

Primary Examiner—Wendy Garber
Assistant Examiner—Alicia M. Harrington
Attorney, Agent, or Firm—Carr & Ferrell LLP

[57] ABSTRACT

A system and method for using scripts and selectable feature parameters to configure digital camera device features. The digital camera includes memory storing scripts for providing digital camera device features, an interface enabling a user to modify feature settings, a port connectable to a host computer for modifying or adding scripts to the memory, and a script manager for interpreting the scripts and the feature settings. The digital camera further includes an imaging device for generating a digitized image, and image processors for enhancing the digitized image according to the scripts and the selected feature settings. The digital camera still further includes command handlers for configuring the imaging device and the image processors according to the scripts and the feature settings.

12 Claims, 12 Drawing Sheets

(Command Send Data Structure)

(Command Receive Data Structure)

SYSTEM AND METHOD FOR USING A SCRIPTING LANGUAGE TO SET DIGITAL CAMERA DEVICE FEATURES

CROSS-REFERENCE TO RELATED APPLICATIONS

This application relates to co-pending U.S. patent application Ser. No. 08/631,173, entitled "System and Method for Using a Unified Memory Architecture to Implement a Digital Camera Device," which is hereby incorporated by reference.

BACKGROUND OF THE INVENTION

1. Field of the Invention

This invention relates generally to digital cameras and more particularly to a system and method for using a scripting language to set digital camera device features.

2. Description of the Background Art

A modern digital camera typically includes an imaging device and a built-in computer. The imaging device captures raw image information representing a scene and is controlled by the built-in computer system. The built-in computer system receives, processes and compresses the raw image information before storing the compressed digital information in an internal memory.

A typical digital camera enables a user to manipulate mechanical buttons, rotatable and toggle switches, etc. to select a few of the camera feature settings. However, the remainder of the digital camera features are typically based on built-in computer system programming. Original Equipment Manufacturers (OEMs) set the software-based features and software-based feature settings for each digital camera. Accordingly, consumers examine both the camera hardware and the camera programming to determine whether or not to purchase the camera.

Except for a few OEM selected features, the camera feature programming is stored in Read-Only Memory (ROM). Thus, the majority of the camera feature programming is not user accessible and thus not modifiable. Further, new features cannot be added. A system and method are needed for enabling an ordinary user to set digital camera device features easily. Further, a system and method are needed for enabling a programmer to add digital camera device features which are also settable by the ordinary user.

SUMMARY OF THE INVENTION

In accordance with the present invention, a system and method are disclosed for using scripts to implement digital camera features. The digital camera includes memory storing scripts for providing digital camera device features, an interface for receiving user selected feature settings, a script manager for interpreting the scripts and the feature settings to generate data structures, and a command handler for configuring the camera to provide the camera features. The digital camera further includes an imaging device for generating a digitized image and image processors for enhancing the digitized image. Since the user need only select the camera feature script and then run and optionally interact with the camera-configuring script, the ordinary user can modify the camera features.

The digital camera includes a port connectable to host computer for adding or modifying scripts to add or modify available camera features. The host computer uses a text editor application program to generate or modify scripts, and optionally uses any error detection application program for error testing the script. The camera may be connected to the host computer for downloading the newly-generated camera-configuring script into camera memory. Alternately, the script can be loaded onto a removable memory card and inserted into the camera. The added or modified script can be run to configure the camera according to a selected feature and setting.

The invention further provides a method for generating data structures from a script. The method begins by receiving a feature setting command which includes a command name, a feature name and a feature setting by an interface from a user. Using a command table which includes a set of command names and corresponding command codes, command codes are extracted based on the command names. Using a command parameter table which includes corresponding parameter formats, the parameters are extracted based on the parameter format list. Parameters may include feature names and settings. Accordingly, a data structure which includes the command code and parameters, including any feature settings in the specified format is then generated by the script manager. The data structure is sent to a command handler for execution and generation of responsive data, which is sent back to the script manager for processing.

DETAILED DESCRIPTION OF THE PREFERRED EMBODIMENT

Figure 1:
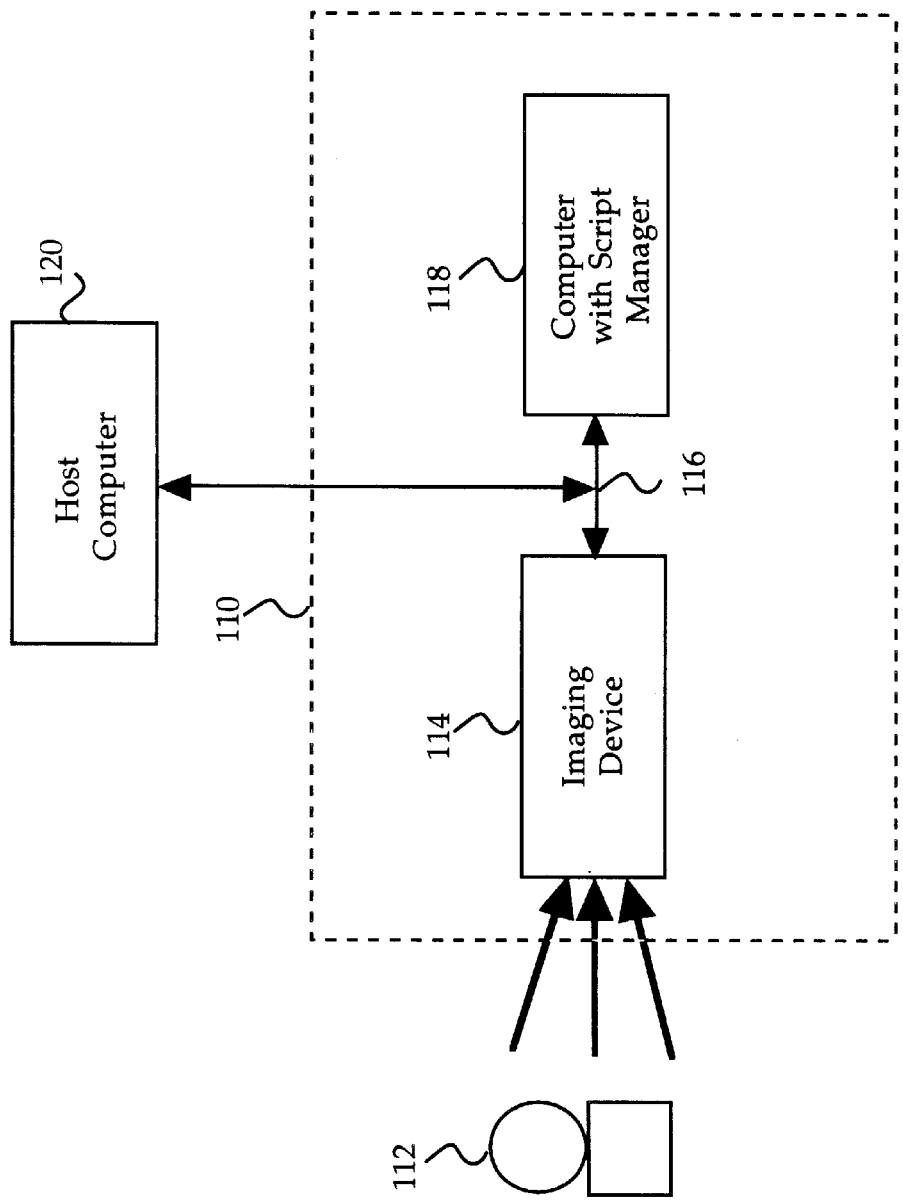
FIG. 1 is a block diagram illustrating a digital camera in accordance with the present invention.

FIG. 1 is a block diagram of a digital camera 110 having modifiable camera features such as exposure, focus, date/time stamp, etc., and coupled to a host computer 120. Camera 110 comprises an imaging device 114 coupled via a system bus 116 to a computer 118. When a photographer depresses an action button (not shown), computer 118 instructs imaging device 114 to take a picture of an object 112. Imaging device 114 optically captures and forwards light-based image information representing object 112 via system bus 116 to computer 118. Based on the camera 110 features, computer 118 performs various image processing functions on the image information before storing the processed data in internal memory (not shown).

Camera 110 uses scripts, which may be authored and error tested on host computer 120, to configure its features. A conventional text editor application program (not shown) may be used on host computer 120 for generating a script and an error reporter application program (not shown) may be used on host computer 120 for error testing the script. If the error reporter locates an error, then the script may be edited until the error reporter determines that the script will provide the intended camera 110 feature. Camera 110 may be connected to host computer 120, and the script may be downloaded from host computer 120 into camera 110 by moving the script to a system folder (not shown) in camera 110 memory or to a flash disk.

Figure 2:
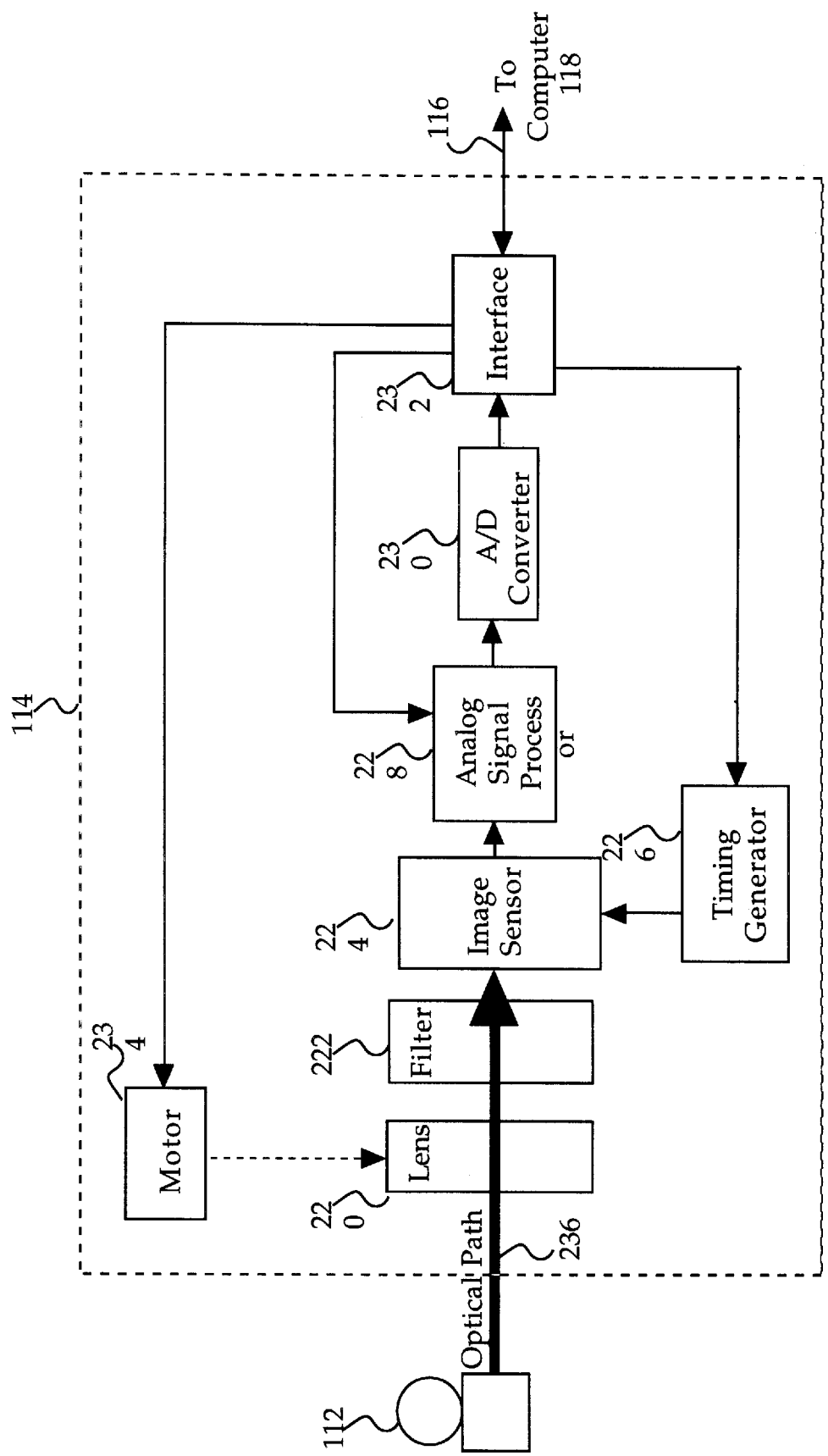
FIG. 2 is a block diagram illustrating the imaging device of FIG. 1.

FIG. 2 is a block diagram illustrating imaging device 114, which comprises a lens 220, a filter 222, an image sensor 224, a timing generator 226, an analog signal processor 228, an analog-to-digital (A/D) converter 230, an interface 232 and a motor 234. A detailed discussion of the preferred elements of imaging device 114 is provided in U.S. patent application Ser. No. 08/355,031, entitled "A System and Method For Generating a Contrast Overlay as a Focus Assist for an Imaging Device," filed on Dec. 13, 1994, which is hereby incorporated by reference.

Briefly, light-based information identifying object 112 passes along optical path 236 through lens 220 and filter 222 to image sensor 224. Image sensor 224 captures the light data, generates light-based image information from the light data, and routes the light-based image information through analog signal processor 228, A/D converter 230 and interface 232. Interface 232 controls analog signal processor 228, motor 234 and timing generator 226, and passes the light-based image information via system bus 116 to computer 118.

Figure 3:
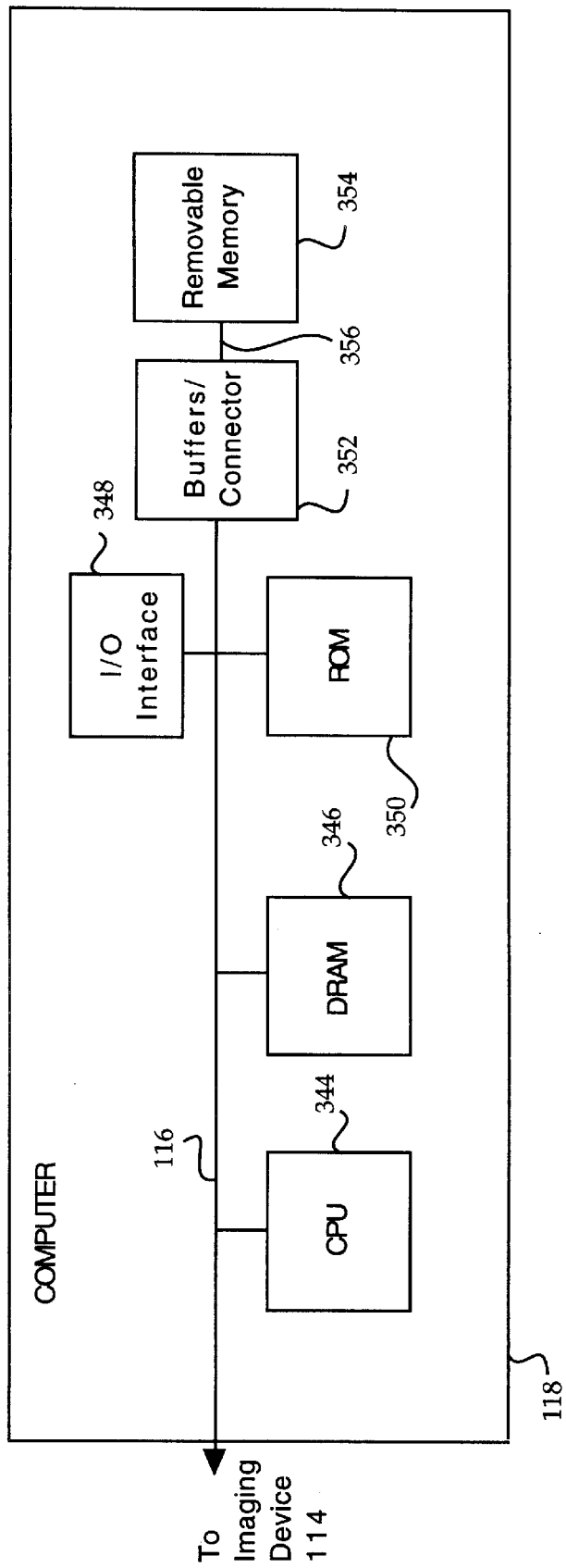
FIG. 3 is a block diagram illustrating the computer of FIG. 1.

FIG. 3 is a block diagram illustrating computer 118, which comprises a central processing unit (CPU) 344, Dynamic Random-Access Memory (DRAM) 346, an Input/Output (I/O) interface 348 and Read-Only Memory (ROM) 350, each connected to system bus 116. Computer 118 optionally further includes a buffers/connector 352 coupled to system bus 116, and a removable memory 354 coupled via a path 356 to buffers/connector 352.

CPU 344 controls camera 110 operations and may include a microprocessor device such as Motorola MPC821 manufactured by Motorola, Inc. of Schaumburg, Ill. or a Hitachi SH3 manufactured by Hitachi America, Ltd. of Terrytown, N.Y. CPU 344 optionally uses a multithreaded environment for concurrent activation of multiple camera 110 control functions. DRAM 346 is conventional DRAM selectively allocated to various storage functions including image data storage. I/O interface 348 permits host computer 120 or a user via externally-mounted user controls and an external LCD display panel to communicate with computer 118.

ROM 350 stores computer-readable program instructions for controlling camera 110 operations. Buffers/connector 352 provides an interface, such as a Personal Computer Memory Card International Standard (PCMCIA) slot, for connecting a removable memory. Removable memory 354 is preferably a readily removable and replaceable non-volatile data storage device such as a flash disk, and serves as an additional image data storage area. A user who possesses several removable memories 354 may replace a full removable memory 354 with an empty removable memory 354 to effectively expand the picture-taking capacity of camera 110.

Figure 4:
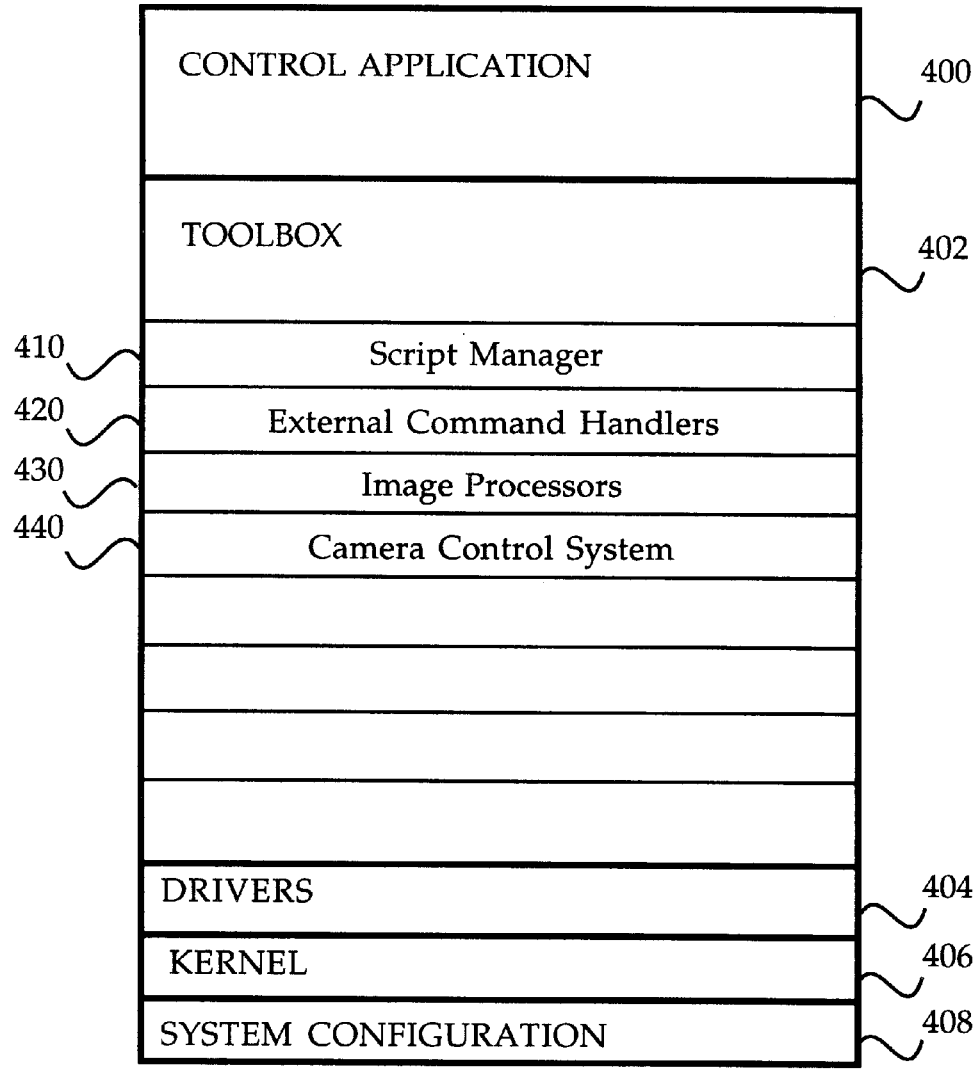
FIG. 4 is a memory map illustrating the ROM of FIG. 3.

FIG. 4 is a memory map illustrating ROM 350, which stores programs including a control application 400, a toolbox 402, drivers 404, a kernel 406 and a system configuration 408. Control application 400 comprises program instructions for managing the various camera 110 functions and executing script commands. Toolbox 402 comprises selected function modules including a script manager 410, external command handlers 420, image processors 430 and camera control system 440. Script manager 410 operates as a script interpreter by generating data structures from script statements which are used to provide the camera 110 features. External command handlers 420 manage the data structures generated by script manager 410 and may store parameter values in a programmable RAM (PRAM) such as an EEPROM. Image processors 430 are programs for enhancing (e.g., adjusting the contrast, sharpening, converting the image to gray-scale, etc.) the digital image received from imaging device 114. Camera control system 440 receives and processes the data structures from the external command handlers 420 for controlling camera functions. System functions, I/O functions, camera hardware functions, image processor functions are controlled by the control application and toolbox routines receiving data structures from external command handlers. Script manager 410 operations are described in greater detail with reference to FIG. 6.

Drivers 404 comprise program instructions for controlling various camera 110 hardware components, such as motor 234 (FIG. 2) and a flash (not shown). Kernel 406 comprises program instructions providing basic underlying camera 110 services including synchronization routines, task creation, activation and deactivation routines, resource management routines, etc. System configuration 408 comprises program instructions for providing initial camera 110 start-up routines such as the system boot routine and system diagnostics.

Figure 5:
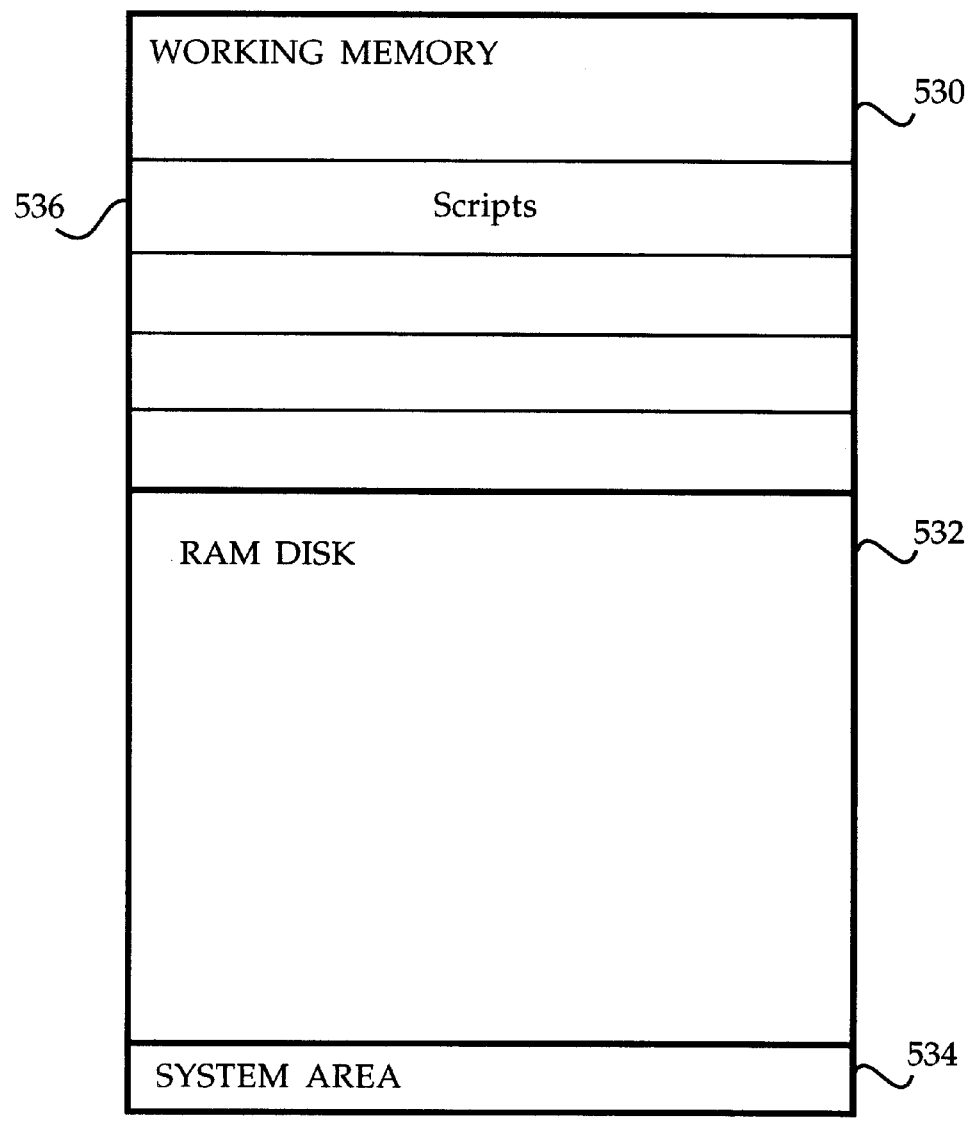
FIG. 5 is a memory map illustrating the DRAM of FIG. 3.

FIG. 5 is a memory map illustrating DRAM 346, which includes a working memory 530, a RAM disk 532 and a system area 534. Working memory 530 stores camera-configuring scripts 536. Scripts 536 comprise program statements which may include commands, which are loaded at start-up by the configuration software from the RAM disk or flash disk. A command is a function routine call comprising a command name, optionally a send list and optionally a receive list. An example of a command is "GetCameraStates (1,'hint':3?,hint)" where "GetCameraStates" is the command name, "1,'hint'" is the send list, ":" separates the send list from the receive list, and "3?,hint" is the receive list. The command name GetCameraStates calls the function routine for retrieving the status value of a particular feature. The "1" in the send list indicates that only one request is being made. The "'hint'" indicates that the value requested is for the hint feature. The "3?" in the receive list indicates that upon receipt of responsive data three values should be skipped, and the "hint" in the receive list specifies the variable in which to store the fourth value. Combining both the send list and the receive list in the command provides a simple command structure.

A script for configuring the camera hint mode, which enables the camera to select exposure type automatically (AUTO), to set exposure such that the background is out of focus (PORT), to set the exposure to capture as much depth of field as possible (LAND), to shift exposure to provide a fast shutter speed for moving objects (SPRT) or to maximize depth of field for objects in very close proximity (CLOS), is as follows:

| | |
|---|---|
| #HINT_01.CSM | (1) |
| name "Set Exposure Hint Mode" | (2) |
| declare u:hint | (3) |
| GetCameraStates(1,"hint":3?,hint) | (4) |
| get hint | (5) |
|   1: "AUTO" | |
|   2: "PORT" | |
|   3: "LAND" | |
|   4: "SPRT" | |
|   5: "CLOS" | |
| end | (6) |
| SetCameraStates(false,1,"hint",hint) | (7) |
| SetScriptStatus(1,"hint") | (8) |

Script manager 410 enables execution and re-execution of the script for modifying and re-modifying the hint mode setting. At any time, a user can instruct script manager 410 to execute the exposure hint feature script for setting or resetting the hint feature.

Statement (1) is a comment identifying the DOS name of the script. Statement (2) specifies the script description to be provided upon user request. Statement (3) defines a variable "hint" as an unsigned integer u. A variable type table is shown below in table 1.

TABLE 1

Variable Types

| Specifier | Description |
|---|---|
| u | 32 bits unsigned integer. |
| i | 32 bits signed integer. |
| f | 32 bits signed fractional part in signed 15 bits signed integer and 16 bits fraction. |
| s | 32 bytes characters containing a string up to 31 significant characters terminated by a null character. |
| n | 16 bytes string contains DOS filename, format as (8 characters).(3 characters) or (8 characters). |
| p | 4 characters string. |
| b | 32 bits of Boolean flags, each bit can be either true(1) or false(0). |
| l | identifier used to indicate a label name. |

Statement (4) is a command for retrieving the previously set value of hint. Statement (5) is a user interaction statement which comprises a command requesting that the user accept or modify the hint mode setting. The list of values and strings separated by colons is the feature value related to the string name for that feature. The user selects a feature by name, and the selected name's value is returned in the variable. Statement (6) ends the list in statement (5). Statement (7) instructs control application 400 to reconfigure the hint mode as the user selects. Lastly, statement (8) communicates modifications to the user via the optional LCD status display.

RAM disk 532 is a RAM-based data storage area for storing the compressed light-based image information and is typically organized in a sectored format similar to that of conventional hard disk drives. RAM disk 532 may use a standardized file system enabling the external host computer system (not shown) to readily access stored data. Because the information is actually stored in RAM, the data can be easily and quickly retrieved. System area 534 typically stores system error information for CPU 344 to report upon restarting computer 118 after a system error occurs.

Figure 6A:
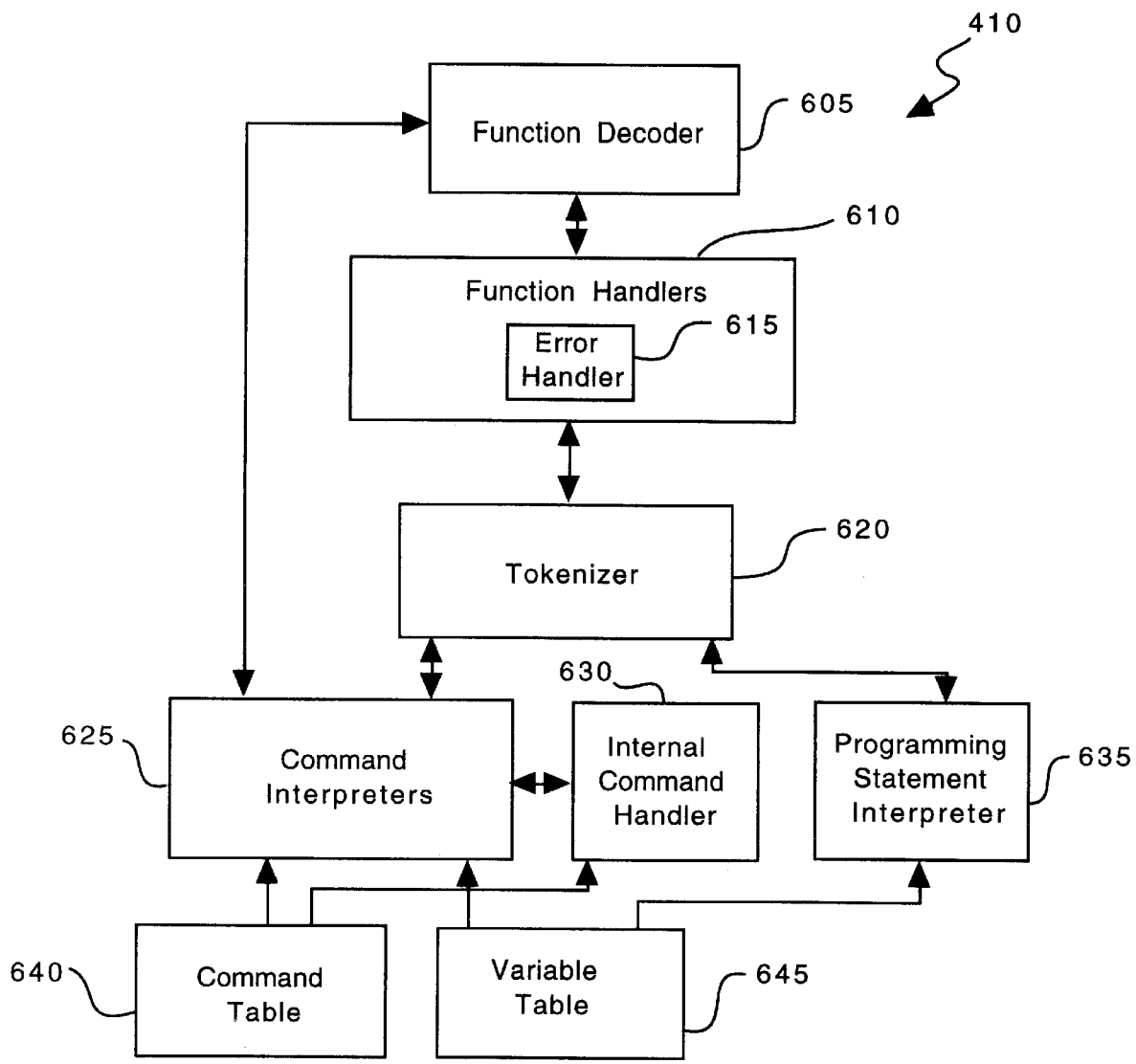
FIG. 6A is a block diagram illustrating the FIG. 4 script manager.

FIG. 6A is a block diagram illustrating script manager 410 which includes a function decoder 605, function handlers 610, a tokenizer 620, a command interpreter 625, internal command handlers 630, a programming statement interpreter 635, a command table 640 and a variable table 645.

Function decoder 605 is a program routine for managing and decoding script messages received from control application 400. Function decoder 605 forwards the decoded script messages to function handlers 610, which are program routines for managing these messages. If the script message only includes simple instructions (i.e., instruction such as initialize, abort, search for, GetName and Reset which do not require script execution), then function handlers 610 perform the required functions and return the appropriate responses via function decoder 605 back to control application 400. If the script message includes a complex instruction, (i.e., an instruction such as GetCameraStates or SetCameraStates which requires script execution and interpretation), then function handlers 610 forward the message to tokenizer 620 for complex instruction handling.

Tokenizer 620 examines the syntax of the statements in the script message to convert the statement's ASCII codes into tokens. Tokenizer 620 passes tokens corresponding to script commands to command interpreters 625 and tokens corresponding to Arithmetic Logic Unit (ALU) statements, Input/Output (I/O) statements, control statements and documentation statements to programming statement interpreter 635.

Command interpreters 625 generate data structures representing the tokens. Command interpreters 625 forward the data structures for external commands (i.e., commands which are used system-wide such as GetCameraStates or SetCameraStates and which require computations or information exchange with external components) to external command handlers 420, by passing them back as a response via the function decoder 605. The control application then passes the response to the appropriate external command handler 420 for processing based on the command code. Command interpreters 625 pass data structures for internal script commands (i.e., commands which are dedicated to script manager 410 such as Wait, Write, GetTimeString or GetDateString) are passed to internal command handler 630.

To indicate whether a command is an internal command or an external command, each command entry in the command table may include an external/internal flag, command interpreter 625 may include an external/internal command table, or the command values may indicate accordingly. To create a data structure from a script command, command interpreters 625 use command table 640 and variable table 645. An example command table 640 is shown in table 2.

TABLE 2

Command Table

| Command Name | Command Code | Parameter Count | Parameter Type List |
|---|---|---|---|
| "GetCameraStates" | 0 × 0005 | 2 | 1, 16, 0, 0, 0, 0 |
| "GetCameraCapabilities" | 0 × 0006 | 2 | 1, 16, 0, 0, 0, 0 |
| "SetCameraStates" | 0 × 0007 | 3 | 4, 1, 17, 0, 0, 0 |
| "GetCameraStatus" | 0 × 0008 | 0 | 0, 0, 0, 0, 0, 0 |

The first column indicates command names, the second column indicates command codes, third column indicates the number of parameters in the parameter type send lists, and the fourth column indicates parameter type send list formats. It will be appreciated that other commands and other parameter type lists may be included in command table 2.

In conjunction with the parameter type list of command table 2, command interpreters 625 use a parameter type table 3 as follows:

TABLE 3

Parameter Type Table

| Parameter | Value | Description |
|---|---|---|
| cuInteger | (1) | integer between 0 and 4G, 32 bit unsigned integer, a preceding 0x or 0× means hex value, otherwise decimal value. |
| cInteger | (2) | integer between −2G and +2G, 32 bit signed integer, a preceding 0x or 0× means hex value, otherwise decimal value. |
| cFixed | (3) | fixed integer between −32767.99999 . . . and +32767.99999 . . . , 32 bit signed fractional part in signed 15-bit signed integer and 16-bit fraction. |
| cBitFlags | (4) | Boolean and bitflags; 32 bits of Boolean flags, each bit can be either true(1) or false(0), "0b" means Boolean, "0x" or "0×" means hex, otherwise decimal value. |
| cPName | (6) | parameter name. |
| cName | (7) | DOS filename; 16 byte string surrounded by double quotes. The format is an up to 8 character filename, followed by a period, and a up to three character extension or up to 8 character filename; example "myscript.csm." |
| cString | (8) | a sequence of characters surrounded by double quotes, max length. is 31, no double quotes inside the character string. |
| cPList | (16) | parameter list. |
| cPVList | (17) | parameter/value list. |
| cNameList | (18) | DOS filename list. |
| cUList | (19) | unsigned integer list. |

For example, the command "GetCameraCapabilities" parameter list "1,16" specifies that the send list must contain a cUInteger, which is defined as a 32 bit unsigned integer between 0 and 4 G, followed by a cPList which is defined as a parameter list. A cPList is simply a list of any length of pName type values. Command interpreters 625 use tables 2 and 3 to compare predefined script formats with actual scripts for performing script command error checking. Error checking is defined in greater detail with reference to FIGS. 7 and 8. Generation of a data structure by command interpreters 625 is described in detail with reference to FIGS. 7–10.

An example variable (or parameter) table is illustrated in table 4 as follows:

TABLE 4

Variable Table

| Variable Name | Type | Value |
|---|---|---|
| "count" | 1 | 0 |
| "valu" | 3 | 1.25 |

External and internal command handlers 420 and 650 accordingly send image processor parameters to image processors 430 for setting camera 110 software-based features, or camera parameters to the camera control system 440 for setting capture-related features. Although not shown, command handlers 420/650 may send I/O parameters to I/O interface 348 for setting I/O features or other system or control parameters to other managers for setting other camera 110 features. The operations of external command handlers 420 and internal command handlers 630 are described below in greater detail with reference to FIG. 7B.

Programming statement interpreter 635 uses variable table 645 to process a programming statement such as control, I/O, ALU or documentation statements. For example, a programming statement may be a definition, a mathematical expression, a logical expression, etc.

If one of the script manager 410 components including the tokenizer 620, the command interpreters 625, the programming statement interpreter 635, the internal command handler 630 locates an error in the script message, then the script manager 410 component sends an error message to an error handler 615 of function handlers 610. The error handler 615 recognizes error codes in the error message, stops script execution and passes an appropriate error message responsively back via function decoder 605 to I/O interface 348.

Figure 6B:
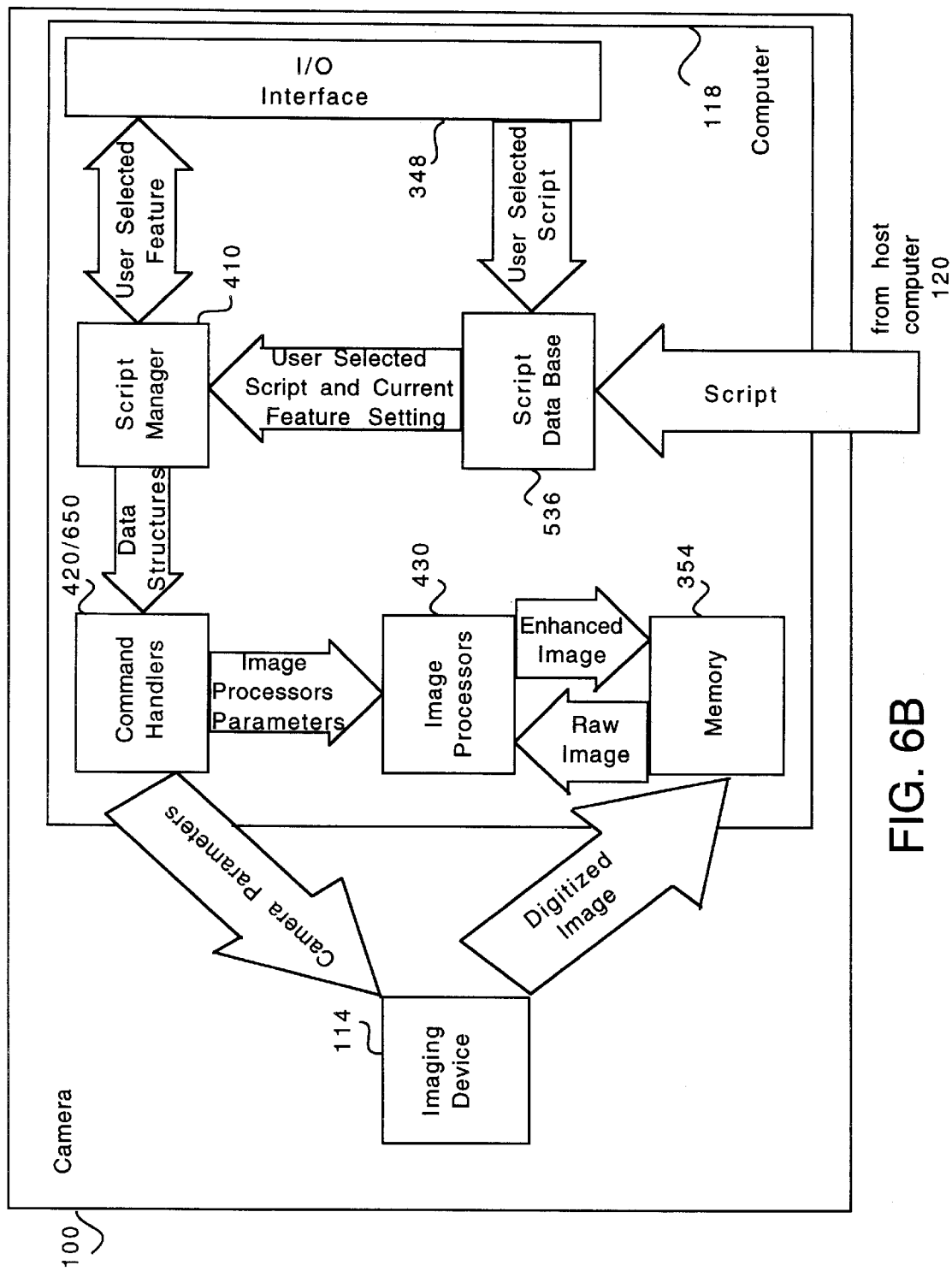
FIG. 6B is a block diagram illustrating operations of the FIG. 1 camera.

FIG. 6B is a block diagram illustrating the operations of camera 100. Imaging device 114 captures and converts an image to a digitized image, and stores the digitized image in memory 354. Image processor 430 takes the raw digitized image and adds image enhancements such as contrast adjustment, sharpening, etc. Image processor 430 stores the enhanced image again in memory 354.

The operations of imaging device 114 and of image processors 430 can be controlled by active scripts and script feature settings. While executing a script, the script manager 410 retrieves and displays the script feature setting currently-stored in the script data base 536 for the selected script. The script manager 410 can interact with a user via I/O interface 348 to enable modification or the currently-stored script feature setting in order to modify the camera device feature. Script manager 410 generates data structures representing commands within the script, as described below with reference to FIGS. 7A and 8–10.

Script manager 410 sends the data structures to external/internal command handlers 420/650, which accordingly send image processor parameters to image processors 430 for setting camera 110 software-based features, camera parameters to camera control software for setting capture features, or other system or control parameters to other appropriate managers. It will be appreciated that a programmer may use host computer 120 to add additional scripts to script data base 536, for adding additional functions and features to camera 110.

Figure 7A:
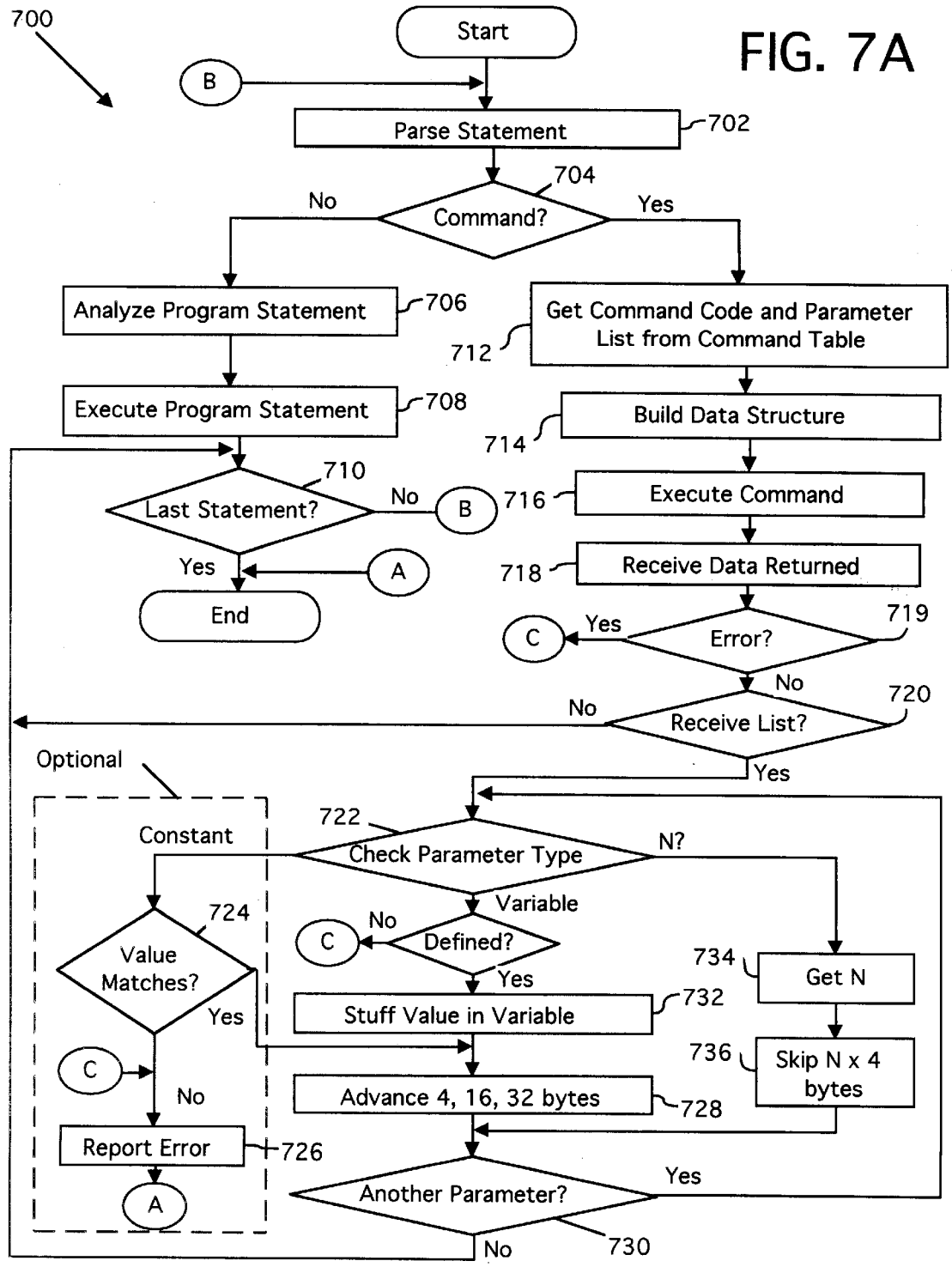
FIG. 7A is a flowchart illustrating the preferred method for generating a data structure from a script statement.

FIG. 7A is a flowchart illustrating a method 700 for managing script 536 statements. Method 700 begins in step 702 by tokenizer 620 receiving and parsing a statement. If tokenizer 620 in step 704 determines that the program statement is not a script command, then tokenizer 620 sends the tokens to programming statement interpreters 635, which in step 706 analyze the statement. Programming statement interpreter 635 in step 708 executes the program statement conventionally. Examples of these statements include control, I/O, ALU and documentation statements. Tokenizer 620 in step 710 determines whether there is another statement in script 536. If so, then tokenizer 620 returns to step 702. Otherwise, method 700 ends.

If tokenizer 620 in step 704 determines that the program statement is a script command, then tokenizer 620 sends the token to command interpreters 625 which in step 712 retrieve the command code and the parameter list from the command table 640 illustrated above in Table 2 described with reference to FIG. 6. Using the command code and the parameter list, command interpreters 625 in step 714 scan the parameters and build a data structure. The step of building a data structure from a command is described in detail with reference to FIG. 8.

Command interpreters 625 in step 716 forward data structures representing external commands via a response through the function decoder 605 back to the control application 400 to external command handler 420 or data structures representing internal commands to internal command handlers 630 for command execution. Command execution is described below with reference to FIG. 7B.

Command interpreters 625 in step 718 receive responsive data returned from command handlers 420 or 650. Command interpreters 625 in step 719 examine the data returned to determine if the data indicates an error. If so, then command interpreters 726 jump to step 726 to report the error. Otherwise, command interpreters 625 continue with step 720 to determine whether the current command includes a receive list. If not, then method 700 returns to step 710. If so, then command interpreters 625 in step 722 examine the expected parameter type in the receive list.

If the expected parameter type is a constant, then command interpreters 625 determine whether the responsive data matches the expected parameter type. If not, then command interpreters 625 inform the error handler 615, which in step 726 reports the error and method 700 then ends. Otherwise, command interpreters 625 in step 728 advance four bytes for an integer value, sixteen bytes for a DOS name or thirty-two bytes for a character string to index to the next parameter. Command interpreters 625 in step 730 determine whether another parameter remains in the receive list. If so, then command interpreters 625 return to step 722. Otherwise, command interpreters 625 return to step 710.

If command interpreters 625 in step 722 determine that the parameter type is a variable, then command interpreters 625 in step 731 determine if the variable has been defined. If not, then method 700 jumps to step 726 to report the error. Otherwise, command interpreters 625 in step 732 stuff the received data value into the variable and proceed to step 728 to index to the next parameter.

If command interpreters 625 in step 728 determine that the parameter type is a number N followed by the symbol "?", then command interpreters 625 in step 734 extract the value N. Command interpreters 625 in step 736 index past N×4 bytes of responsive data, i.e. N parameters. The type "N?" is used to index past parameters which are known to be unnecessary for performing the current instruction. For example, the command "GetCameraStates(1, 'fmod':3?, abc)" requests the current state of camera 110 focus mode. The responsive data may be "1,'fmod',1,25" where "25 represents the current focus mode state. Parameter "3?" causes command interpreters 625 to jump over the first three parameters "1,'fmod',1", and on the next loop stuff the value "25" into the variable "abc." Thus, the function "N?" eliminates examination of parameters known to be unnecessary. Command interpreters 625 then proceed to step 734.

Figure 7B:
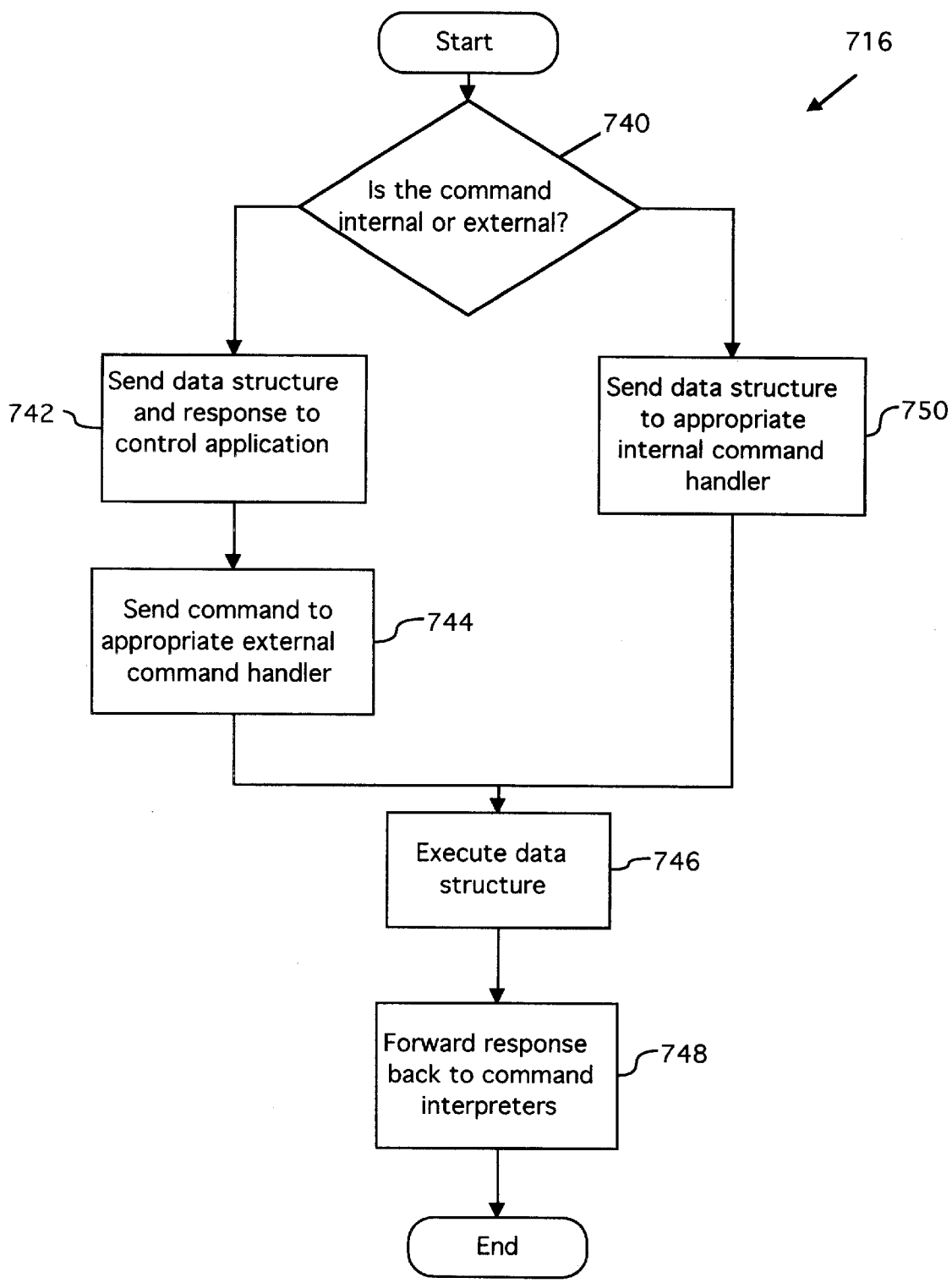
FIG. 7B is a flowchart illustrating the preferred method for executing a command.

FIG. 7B is a flowchart illustrating details of the method 716 for executing a command. Method 716 begins with step 740 by command interpreters 625 determining whether the command is an external command or an internal command. If the command is an external command, then command interpreters 625 in step 742 sends the data structure (which represents the command and the send list) and the response code to function decoder 605, which decodes and forwards the data structure and response code to control application 400. Control application 400 in step 744 sends the data structures to the appropriate external command handler 420. The appropriate external command handler 420 in step 746 executes the command data structure and in step 748 forwards the appropriate response data back to the control application, which in turn calls the script manager 410 with the result. The function decoder 605 sends the response data back to command interpreters 625. Method 716 then ends.

If in step 740 command interpreters 625 determine that the command is an internal command, then command interpreters 625 in step 750 sends the data structure (which represents the command and the send list) to the appropriate internal command handler 630. Method 716 then jumps to step 746.

Figure 8:
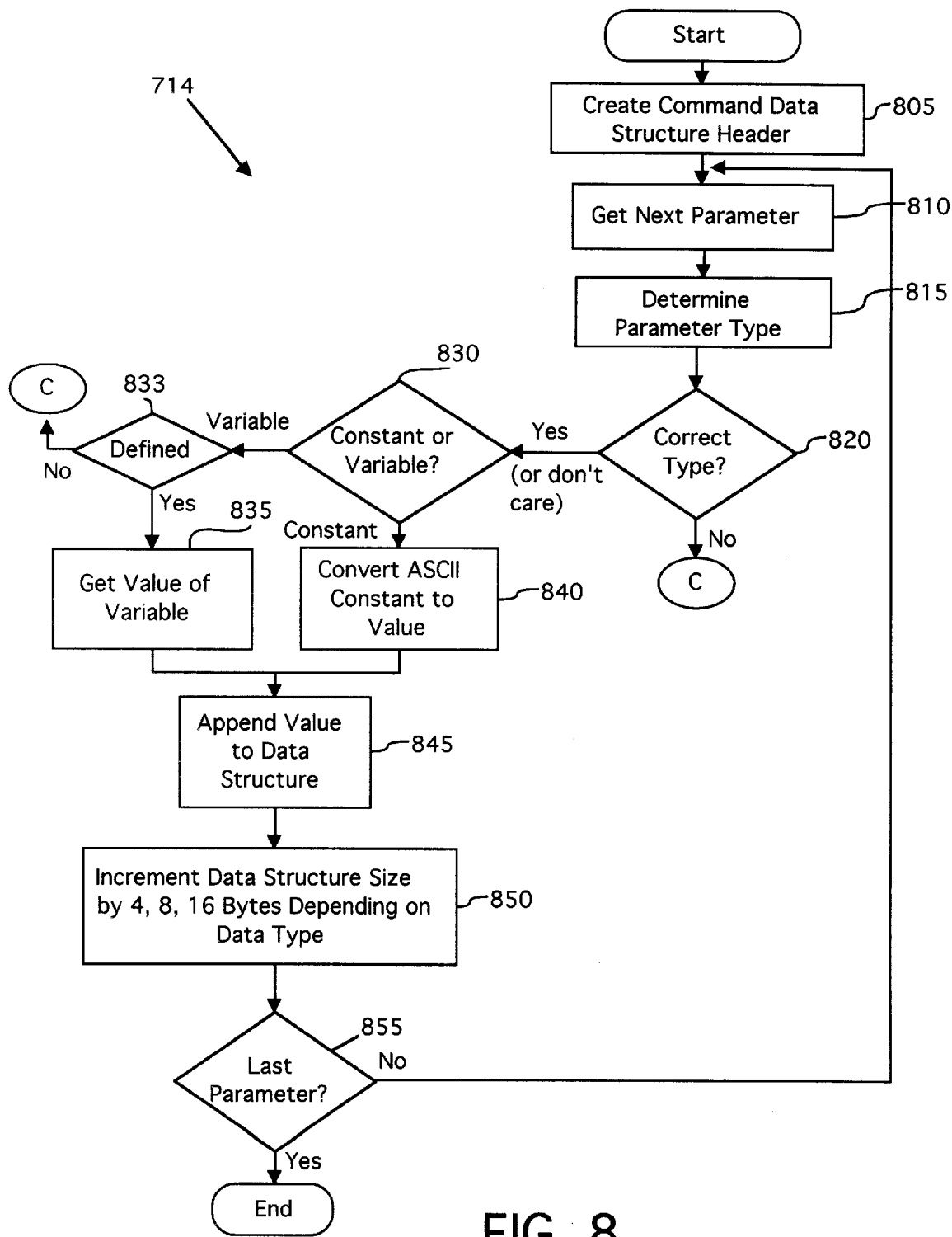
FIG. 8 is a flowchart further illustrating the step of building a data structure of FIG. 7A.

FIG. 8 further illustrates step 714 of building a data structure. Step 714 begins in step 805 by command interpreters 625 creating a command data structure header. Command interpreters 625 in step 810 get the next parameter and in step 815 determine the parameter type. Command interpreters 625 in step 820 determine if the parameter matches the expected parameter type. For example, by examining table 2 and table 3, command interpreters 625 expect the command "GetCameraStates" to be followed by a send list comprising a cUInteger (1) in turn followed by a cPList (16). If the selected parameter is not a member of the expected parameter type, then command interpreters 625 forward a message to error handler 615, which in step 825 reports the error via a response through the function decoder 605 to the control application 400. The control application reports the error to the user. As illustrated by jump symbol "A," method 700 then ends If the selected parameter is a member of the expected parameter type, then command interpreters 625 in step 830 determine whether the parameter is a constant or a variable. If the parameter is a variable, then command interpreters 625 in step 833 determine if the variable is defined. If not, then method 714 jumps to step 726 (FIG. 7A) to report the error. Otherwise, command interpreters 625 in step 835 retrieve the value of the variable. If the parameter is a constant, then command interpreters 625 convert the ASCII constant to a value. In either case, command interpreters 625 in step 845 append the value to the send data structure. Command interpreters 625 in step 850 increment the data structure size in the header by 4, 8 or 16 bytes depending on the data type. Command interpreters 625 in step 855 determine if the retrieved parameter is the last parameter. If so, then method 714 ends. If not, then method 714 returns to step 810.

Figure 9:
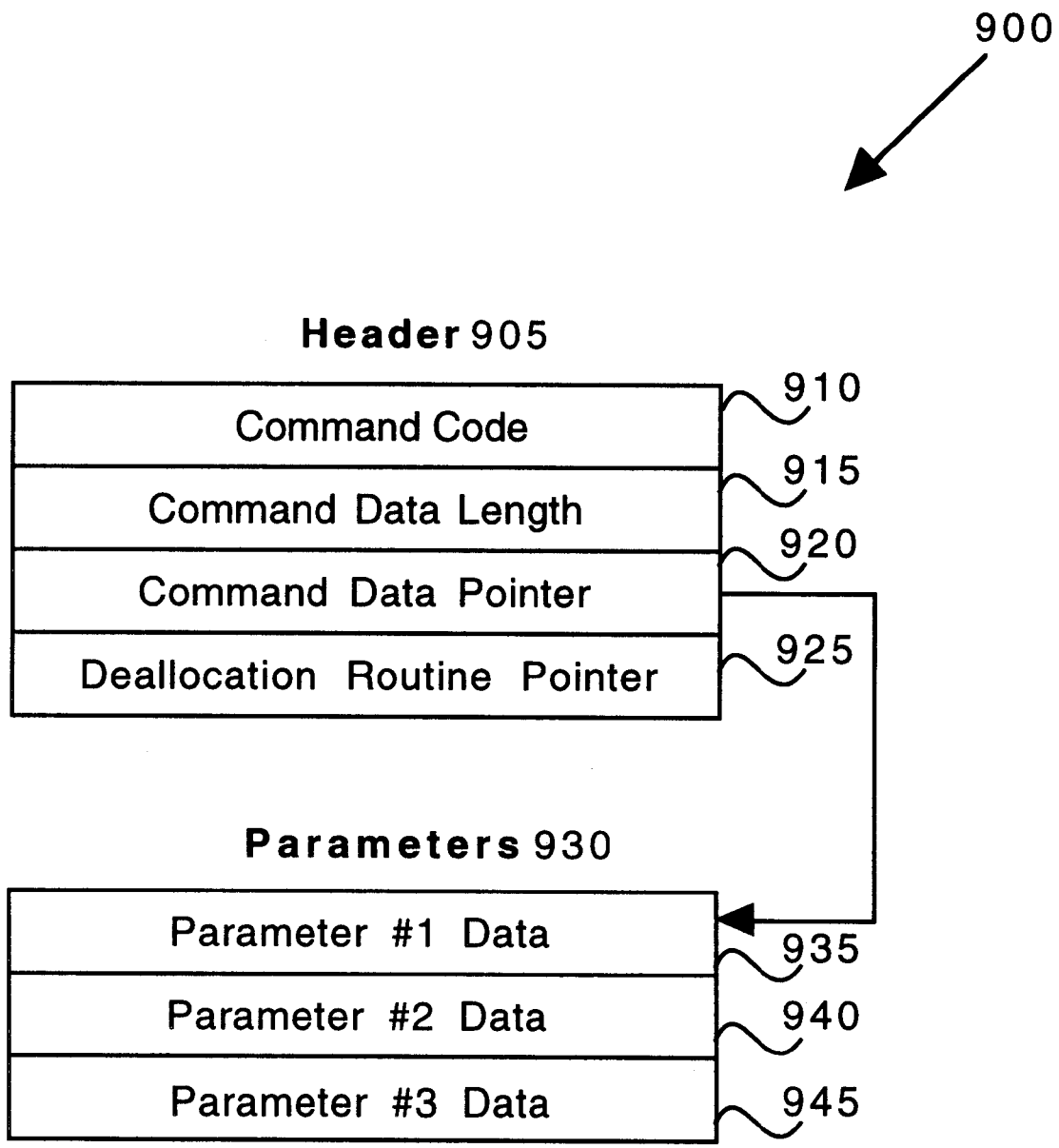
FIG. 9 is a block diagram illustrating an external command send data structure.

FIG. 9 is a block diagram illustrating a command send data structure 900, which comprises a header 905 and appended parameters 930, generated by command interpreters 625. Header 905 comprises a command code 910, a command data length 915, a command data pointer 920 and a deallocation routine pointer 925. Parameters 930 may include a plurality of appended parameters 935–945.

For the example command "GetCameraStates(1, 'fmod':3?,fmod)", command interpreters 625 retrieve the command code "0x0005" for "GetCameraStates" as command code 910, set command data length 915 to zero and place the value nil into command data pointer 920. Command interpreters 625 append an address of the subroutine which will dispose of the data structure as a deallocation routine pointer 925. Command interpreters 625 retrieve the parameter "1" and determine that it matches the expected parameter type cUInteger. Since the parameter is a constant, command interpreters 625 append the 32-bit parameter value representing "1" to the data structure as parameter #1 data 935. Command interpreters 625 modify command data pointer 920 to point to parameter #1 data 935, and increment command data length 915 by four bytes. Command interpreters 625 retrieve the parameter "fmod" and determine that it matches the expected parameter type cPList. Since the parameter type is a parameter name constant, external command interpreters 625 append the constant "fmod" to send data structure 900 as parameter #2 data 940. Command interpreters 625 increment command data length 915 by another four bytes. In this example, there are only two parameters and command data length is eight bytes.

Figure 10:
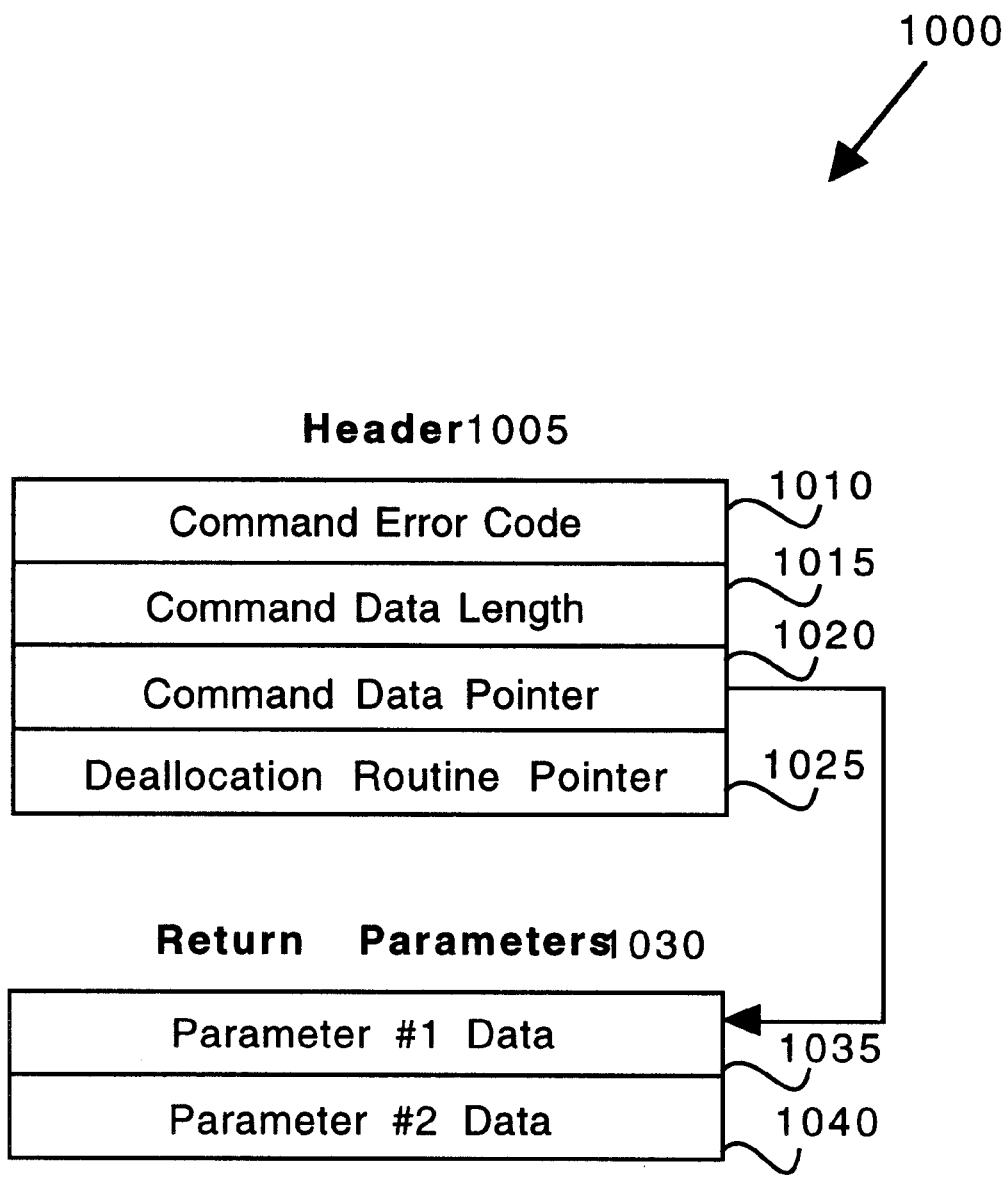
FIG. 10 is a block diagram illustrating an external command receive data structure.

FIG. 10 is a block diagram illustrating a command retrieve data structure 1000, which comprises a header 1005 and return parameters 1030. Header 1005 comprises a command error code 1010, a command data length 1015, a command data pointer 1020 and a deallocation routine pointer 1025. Return parameters 1030 may include parameter #1 data 1035 and parameter #2 data 1040. Any number of parameters may be included.

As described in FIG. 7A, command interpreters 625 receive the command receive data structure 1000 as responsive data returned from either external command handlers 420 or internal command handlers 630. Command interpreters 625 process the receive list "3?,fmod" with the data structure 1030 values.

The foregoing description of the preferred embodiments of the invention is by way of example only, and other variations of the above-described embodiments and methods are provided by the present invention. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims:

What is claimed is:

1. A digital camera system comprising:

an imaging device for receiving picture data;

script memory coupled to the imaging device for storing camera-configuring scripts;

an interface coupled to the script memory for enabling the selection of a script feature setting;

a script manager, coupled to the interface for interpreting the script and the script feature setting, and including
      a command interpreter coupled to the script memory,
      a programming statement interpreter coupled to the script memory, and
      a tokenizer for determining when to send an instruction to the command interpreter and when to send an instruction to the programming statement interpreter;

a command handler coupled to the script manager for processing the script based on the script feature setting to provide a camera feature;

control application memory coupled to the imaging device for controlling the camera features based on camera parameters; and an image processor coupled to the command handler for controlling a processing of the picture data based on the script feature setting.

2. The system of claim 1, wherein the command handler includes
   an external command handler coupled to the script manager for processing external commands; and
   an internal command handler coupled to the script manager for processing internal commands.

3. A digital camera system comprising:

an imaging device for receiving picture data;

script memory coupled to the imaging device for storing camera-configuring scripts and a command;

an interface coupled to the script memory for enabling the selection of a script feature setting;

a script manager coupled to the interface for interpreting the script and the script feature setting, and including an error handler for providing an error report to the interface upon indication of an error in the script, and further including a command table for interpreting the command, and a command handler coupled to the script manager for processing the script based on the script feature setting to provide a camera feature.

4. The system of claim 3, further comprising a communications port coupled to the script memory for transferring different scripts from an external host computer to the script memory.

5. A digital camera system, comprising:

means for receiving picture data;

script means, coupled to the means for receiving, for storing a camera-configuring script;

interface means, coupled to the script means, for enabling selection of a script feature setting;

interpretation means, coupled to the interface means, for interpreting the script and the script feature setting, and including
      a command interpreter means coupled to the means for receiving,
      a programming statement interpreter means coupled to the means for receiving; and
      a tokenizer for determining when to send an instruction to the command interpreter means and when to send an instruction to the programming statement interpreter means;

command handler means, coupled to the interpretation means, for processing the script based on the script feature setting to provide a camera feature;

control means, coupled to the means for receiving, for controlling the camera features based on camera parameters; and image processor means, coupled to the command handler means, for controlling a processing of the picture data based on the script feature setting.

6. The system of claim 5, wherein the command handler means includes:

external command handler means coupled to the interpretation means for processing external commands; and internal command handler means coupled to the interpretation means for processing internal commands.

7. A system for using parameter tables to generate a data structure for setting digital camera device features, comprising:

means for receiving including an I/O interface for receiving a camera feature setting command which includes a command name, a feature name and a feature setting from a user;

a command table, coupled to the means for receiving, including command names and corresponding command codes;

a feature table, coupled to the means for receiving, including features, corresponding feature codes, corresponding available feature settings and corresponding feature setting codes;

an interpreter, coupled to the means for receiving, for using the command table and the feature table to generate a data structure having the command code representing the command, the feature code representing the feature and the feature setting code representing the feature setting; and a command handler, coupled to the interpreter, for processing data structures.

8. A system for using parameter tables to generate a data structure for setting digital camera device features, comprising:

means for receiving a camera feature setting command which includes a command name, a feature name and a feature setting;

a command table, coupled to the means for receiving, including command names and corresponding command codes;

a feature table, coupled to the means for receiving, including features, corresponding feature codes, corresponding available feature settings and corresponding feature setting codes;

an interpreter, coupled to the means for receiving, for using the command table and the feature table to generate a data structure having the command code representing the command, the feature code representing the feature and the feature setting code representing the feature setting; and an error handler, coupled to the interpreter, for providing an error report upon indication of an error.

9. A method of using parameter tables to generate a data structure for setting digital camera device features, comprising the steps of:

receiving, by an interface, a feature setting command which includes a command name, a feature name and a feature setting;

using, by a script manager, a command table which includes a set of command names and corresponding command codes to extract command codes based on the command names;

using, by the script manager, a feature table which includes a plurality of feature sets, each set including a feature name, a corresponding feature code, corresponding available feature settings and corresponding feature setting code, to extract the corresponding feature code and corresponding feature setting code based on the received feature name and the received feature setting;

generating, by the script manager, a message packet which includes the command code, the feature code and the feature setting code; and providing an error report upon indication of an error to the interface.

10. The method of claim 9, further comprising, after generating, the step of using a control application to modify camera parameters for setting camera device features.

11. A method of using parameter tables to generate a data structure for setting digital camera device features, comprising the steps of:

receiving, by an interface, a feature setting command which includes a command name, a feature name and a feature setting;

using, by a script manager, a command table which includes a set of command names and corresponding command codes to extract command codes based on the command names;

using, by the script manager, a feature table which includes a plurality of feature sets, each set including a feature name, a corresponding feature code, corresponding available feature settings and corresponding feature setting code, to extract the corresponding feature code and corresponding feature setting code based on the received feature name and the received feature setting;

generating, by the script manager, a data structure which includes the command code, the feature code and the feature setting code;

forwarding, by the script manager, the data structure to a command handler for processing the data structure; and sending, by the command handler, responsive data in a predetermined format back to the script manager.

12. The method of claim 11, further comprising ignoring, by the script manager, a portion of the responsive data based on a flag in the command.

\* \* \* \* \*

UNITED STATES PATENT AND TRADEMARK OFFICE
CERTIFICATE OF CORRECTION

PATENT NO : 6,094,221
DATED : July 25, 2000
INVENTOR(S): Eric C. Anderson

It is certified that error appears in the above-identified patent and that said Letters Patent are hereby corrected as shown below:

On the title page, Inventor line, replace "Eric C. Andersion" with --Eric C. Anderson--.

In Column 3, Line 29, replace "AID" with --A/D--.

Signed and Sealed this

Twenty-fourth Day of April, 2001

NICHOLAS P. GODICI

*Attest:*

*Attesting Officer*      *Acting Director of the United States Patent and Trademark Office*

UNITED STATES PATENT AND TRADEMARK OFFICE
CERTIFICATE OF CORRECTION

PATENT NO : 6,094,221
DATED : July 25, 2000
INVENTOR(S): Eric C. Anderson

Page 2 of 2

It is certified that error appears in the above-identified patent and that said Letters Patent are hereby corrected as shown below:

In the Drawings:

Sheet 2 of 12, replace Fig. 2 with the following:

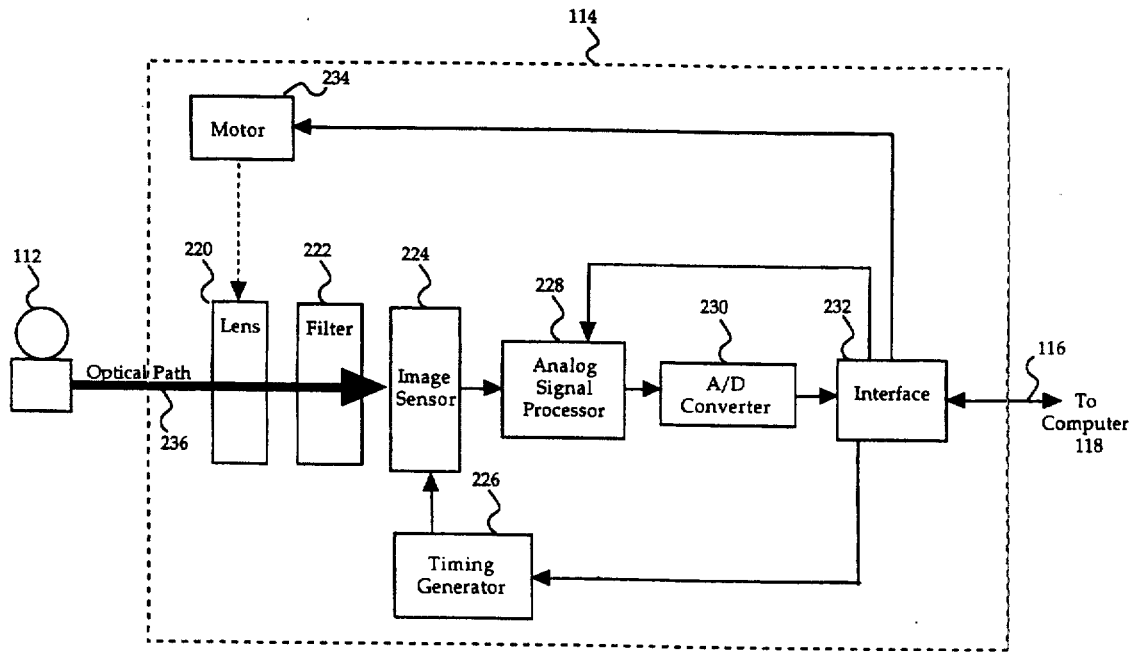

Fig. 2